United States Patent
Marck et al.

(10) Patent No.: US 12,019,316 B2
(45) Date of Patent: Jun. 25, 2024

(54) COLOR-BALANCED LENSES EXHIBITING REDUCED BLUE LIGHT TRANSMITTANCE

(71) Applicant: ESSILOR INTERNATIONAL, Charenton-le-Pont (FR)

(72) Inventors: Christelle Marck, Charenton-le-Pont (FR); Elliot French, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 798 days.

(21) Appl. No.: 16/973,846

(22) PCT Filed: Jun. 11, 2019

(86) PCT No.: PCT/EP2019/065159
§ 371 (c)(1),
(2) Date: Dec. 10, 2020

(87) PCT Pub. No.: WO2019/238648
PCT Pub. Date: Dec. 19, 2019

(65) Prior Publication Data
US 2021/0181532 A1    Jun. 17, 2021

(30) Foreign Application Priority Data

Jun. 12, 2018  (EP) .................................. 18305722

(51) Int. Cl.
*G02C 7/10* (2006.01)
*B29B 7/88* (2006.01)
(Continued)

(52) U.S. Cl.
CPC ............... *G02C 7/104* (2013.01); *B29B 7/88* (2013.01); *B29D 11/00923* (2013.01);
(Continued)

(58) Field of Classification Search
None
See application file for complete search history.

(56) References Cited

U.S. PATENT DOCUMENTS 6,612,697 B1 *  9/2003  Aurelius ............... G02C 7/105
                                                  351/44
8,210,678 B1 *  7/2012  Farwig .................... G02B 5/22
                                                  351/159.65
(Continued)

FOREIGN PATENT DOCUMENTS

JP  2008134618   6/2008
JP  2013238634   11/2013
(Continued)

OTHER PUBLICATIONS

Search Report and Written Opinion Issued in Corresponding PCT Patent Application No. PCT/EP2019/065159, dated Jul. 15, 2019.

*Primary Examiner* — Darryl J Collins
(74) *Attorney, Agent, or Firm* — Norton Rose Fulbright US LLP

(57) ABSTRACT

The object of this invention is to provide optical articles having one or more transmittance-attenuating dyes. Each dye attenuates transmission of a certain wavelength range. Different dyes can be combined in different concentrations to tune the transmittance spectrum through a lens. The transmittance-attenuating dyes can be incorporated into different optical articles using different production methods.

14 Claims, 4 Drawing Sheets

(51) Int. Cl.
*B29D 11/00* (2006.01)
*G02B 1/04* (2006.01)
*G02B 5/20* (2006.01)
*B29K 69/00* (2006.01)
*B29K 105/00* (2006.01)

(52) U.S. Cl.
CPC ............ *G02B 1/041* (2013.01); *G02B 5/20* (2013.01); *G02C 7/108* (2013.01); *B29K 2069/00* (2013.01); *B29K 2105/0032* (2013.01); *B29K 2995/002* (2013.01); *G02C 2202/16* (2013.01)

(56) References Cited

U.S. PATENT DOCUMENTS

| | | | | |
|---|---|---|---|---|
| 9,829,724 | B1* | 11/2017 | Perricone | G02C 7/049 |
| 2002/0005509 | A1* | 1/2002 | Teng | H01J 11/44 |
| | | | | 252/582 |
| 2007/0216861 | A1* | 9/2007 | Ishak | G02C 7/10 |
| | | | | 351/159.24 |
| 2013/0141693 | A1* | 6/2013 | McCabe | B29D 11/00865 |
| | | | | 351/159.56 |
| 2013/0271725 | A1* | 10/2013 | Chiou | G02C 7/10 |
| | | | | 351/159.56 |
| 2014/0093661 | A1* | 4/2014 | Trajkovska | C09B 67/0084 |
| | | | | 427/160 |
| 2016/0070119 | A1 | 3/2016 | McCabe et al. | |
| 2016/0231595 | A1* | 8/2016 | Grasso | G02C 7/102 |
| 2017/0307794 | A1 | 10/2017 | Hunter | |
| 2018/0113328 | A1* | 4/2018 | Weber | G02B 5/282 |
| 2019/0346695 | A1* | 11/2019 | Shan | G02C 7/104 |

FOREIGN PATENT DOCUMENTS

| | | |
|---|---|---|
| WO | WO 2014/111099 | 7/2014 |
| WO | WO 2016/148984 | 9/2016 |
| WO | WO 2017/108976 | 6/2017 |
| WO | WO 2018/045040 | 3/2018 |

* cited by examiner

I. Master-Batch Concentrate

II. Target-Batch Concentration

I. Close mold    II. Inject molten polycarbonate/dye blend    III. Open Mold & Eject lens I. Close mold    II. Inject molten polycarbonate/dye blend    III. Open Mold & Eject lens Concepts A and B of Example 2
Concept E of Example 5

COLOR-BALANCED LENSES EXHIBITING REDUCED BLUE LIGHT TRANSMITTANCE

CROSS-REFERENCE TO RELATED APPLICATIONS

This application is a national phase application under 35 U.S.C. § 371 of International Application No. PCT/EP2019/065159 filed Jun. 11, 2019 which claims priority to EP Application No. 18305722.3 filed Jun. 12, 2018, the entire contents of each disclosure is specifically incorporated by reference herein without disclaimer.

FIELD OF THE INVENTION

The invention relates to the field of ophthalmic lenses.

BACKGROUND

Melatonin is a hormone that plays a role in sleep regulation and wakefulness. This hormone helps the body maintain good sleep architecture, which includes the ability to fall asleep quickly, sleep deeply and restoratively for seven to eight hours, and sleep throughout the night without waking up frequently. Melatonin is produced by melanopsin, a photopigment expressed in some retinal cells. When melanopsin cells detect light, less melatonin is produced, making a person feel more awake. When it is dark and melanopsin cells do not detect light, more melatonin is produced, making a person feel tired. WO 2017/108976 discloses a method for quantifying the efficiency of a light filter to stimulate a physiological effect correlated to melanopsin light-absorption, and is incorporated by reference herein in its entirety.

Some wavelengths of light within the visible range have been shown to have physiological effects on human beings. For example, exposure to blue light with a wavelength between 470 and 525 nm has been shown to trigger sleeplessness. Blue light suppresses melatonin production for more than twice as long as other light wavelengths, and alters circadian rhythms by twice the degree, especially in young children. Interference with the body's 24-hour circadian rhythms can have a significant effect on health, creating problems with the cardiovascular, metabolic, and immune systems, disturbing mood, and compromising cognitive function. Researchers have also found that blue light prevents body temperature from dropping during the night, which may also impact sleep and alter circadian rhythms.

Increasing exposure to blue light during daytime hours has been shown to reduce daytime sleepiness, speed reaction times, elevate alertness, and strengthen attention span. Unfortunately, most of the light that is emitted from computer screens, tablets, televisions and cell phones falls into this wavelength range. Taking steps to manage blue light exposure may aid in restoring melatonin secretion and improving sleep architecture. To that end, it may be advisable for a spectacle wearer to wear ophthalmic lenses that attenuate blue light transmittance close to bedtime.

It is possible to tailor lenses to reduce the amount of blue light that reaches a wearer's eyes. Dyes may be incorporated into lenses to tune the amount of specific frequency ranges of light that are transmitted through the lens. Combinations of dyes can be used to assist in balancing the color of lenses designed to reduce blue light transmittance. Such lenses may also provide increased visual performance due to increased contrast sensitivity. In view of the foregoing, there is a need for an optical article capable of at least partially blocking blue light and other frequencies of light outside of the blue color spectrum.

SUMMARY

The incorporation of a plurality of dyes, each of which reduces transmittance in a different region of the visible spectrum, provides optical articles that reduce transmittance of blue light and effect melatonin secretion. Combinations of dyes can be used to reduce the blue light transmittance and provide a neutral colored lens. The dyes may be incorporated into different lens components using various production methods. The relative amounts of the dyes may be adjusted to tune transmittance at various wavelengths and provide the desired degree of color balance. In some aspects, the desired degree of color balance corresponds to transmitted light having an a* of less than 12, and a b* value of less than 4, preferably a b* value of less than 1.

Some aspects of the present disclosure are directed towards an optical article comprising a polymerized lens comprising at least one polymer. The optical article includes a lens component configured to impart reduced light transmittance over a plurality of wavelength regions, with a first light transmittance-reducing dye configured to impart a first region of reduced light transmittance located between about 460 nanometers and 510 nanometers, a second light transmittance-reducing dye configured to impart a second region of reduced light transmittance located between about 570 nanometers and 600 nanometers, and a third light transmittance-reducing dye configured to impart a third region of reduced light transmittance located between about 670 nanometers and 715 nanometers. In some embodiments, the nature and concentration of each of the first two dyes can be selected to provide a color balanced optical article. In some aspects, a color balanced optical article corresponds to an optical article in which transmitted light has an a* of less than 12, and a b* value of less than 4, preferably a b* value of less than 1. In some aspects, the nature and concentration of the third dye can be used to balance the color of the first two dyes. In some aspects, the transmittance-reducing dyes provide a resulting average transmission from 460 nanometers to 510 nanometers of less than 60%, a resulting average transmission from 570 nanometers to 600 nanometers of less than 75%, a resulting average transmission from 670 nanometers to 715 nanometers of less than 80%. In some aspects, an optical article having three light transmittance-reducing dyes has a resulting total transmission TvD65 greater than 8%, preferably greater than 68%. The total luminous transmittance TvD65 is defined in the range of 380 nm to 780 nm using CIE D65 illuminant. It should be calculated using the extrapolated values of illuminant D65 for the range of 700 nm to 780 nm. The transmittance-reducing dyes provide an ophthalmic lens having an a*(CIED65 at 10°) of less than 12, and a b*(CIED65 at 10°) of less than 4, preferably a b* value of less than 1.

The lens component configured to impart reduced light transmittance may be any component of a final ophthalmic article product. In some embodiments, the lens component configured to impart reduced light transmittance is the polymerized lens, also referred to as the base lens. In this embodiment, the polymerized lens comprises a blend of at least one polymer and the light transmittance-reducing dyes. The at least one polymer may be a polycarbonate, a polyurethane, or Trivex. In some aspects, a polymeric pellet is blended with light transmittance-reducing dyes to provide a polymeric pellet qualifier batch having a target dye concentration. The dye-inclusive qualifier batch pellet blend may be used to produce a polymerized lens, i.e., a base lens, comprising the light transmittance-reducing dyes.

In some aspects, the lens component configured to impart reduced light transmittance is a colored wafer. A colored wafer may be produced from a dye-inclusive qualifier batch pellet blend. In some embodiments, the colored wafer is an extruded and thermoformed film. In some embodiments, the colored wafer is an injection molded film.

In some embodiments, the lens component configured to impart reduced light transmittance is a coating matrix. The coating matrix is selected from the group consisting of a polyurethane coating, expoxy, acrylic, sol-gel, or any combination thereof.

The optical article having light transmittance-reducing dyes may include at least one additional light transmittance-reducing component. In some embodiments, the at least one additional light transmittance-reducing component that reduces light transmittance is an interferential filter. An interferential filter is a light filter consisting of at least two, each with a specific refractive index and geometry designed so that the light reflected from each material's boundary will together become enhanced at desired wavelengths. One such example is a multi-layered optical film that consists of multiple stacks of layers each with a specific refractive index and thickness designed to selectively pass certain wavelengths of light while reflecting other wavelengths. In some embodiments, the at least one additional light transmittance-reducing component that reduces light transmittance in a region that overlaps with at least one of the first, second, and third light reduced light transmittance regions. The at least one additional light transmittance-reducing component is a tinted film, in some embodiments.

Some aspects of the present disclosure are directed towards a method of making an optical article having a lens component configured to impart reduced light transmittance over a plurality of wavelength regions, with a first light transmittance-reducing dye configured to impart a first region of reduced light transmittance located between about 460 nanometers and 510 nanometers, a second light transmittance-reducing dye configured to impart a second region of reduced light transmittance located between about 570 nanometers and 600 nanometers, and a third light transmittance-reducing dye configured to impart a third region of reduced light transmittance located between about 670 nanometers and 715 nanometers. The method of making the ophthalmic lens exhibiting reduced light transmittance over a plurality of wavelength regions comprises the steps of blending light transmittance-reducing dyes and a first set of polymer pellets to produce a master-batch concentrate. The master-batch concentrate is then added to a second set of polymer pellets to achieve the targeted concentration of the light transmittance-reducing dyes in the second set of polymer pellets, referred to herein as a qualifier batch blend. In some embodiments, the dye-inclusive qualifier batch pellet blend is used to produce a polymerized lens, i.e., a base lens, comprising the light transmittance-reducing dyes. In some embodiments, the dye-inclusive qualifier batch pellet blend is used to produce a colored wafer.

"Ophthalmic lens," according to the disclosure, is defined as a lens adapted, namely for mounting in eyeglasses, whose function is to protect the eye and/or to correct vision. This lens can be an afocal, unifocal, bifocal, trifocal, or progressive lens. The ophthalmic lens may be corrective or uncorrective. Eyeglasses wherein ophthalmic lenses will be mounted could be either a traditional frame comprising two distinctive ophthalmic lenses, one for the right eye and one for the left eye, or like mask, visor, helmet sight or goggle, wherein one ophthalmic lens faces simultaneously the right and the left eyes. Ophthalmic lenses may be produced with traditional geometry as a circle or may be produced to be fitted to an intended frame.

A "polymerized lens" can be made of at least one polymer that is derived from a thermally-polymerizable composition, a photo-polymerizable composition, or a mixture thereof. Preferred polymerizable compositions include polycarbonates, polyamides, polyimides, polysulfones, copolymers of polyethylene terephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR39® by the PPG Industries company, the corresponding marketed lenses being referred to as ORMA® lenses from ESSILOR), polycarbonates such as those derived from bisphenol-A, (meth)acrylic or thio(meth) acrylic polymers and copolymers such as poly methyl methacrylate (PMMA), urethane and thiourethane polymers and copolymers, epoxy polymers and copolymers, episulfide polymers and copolymers.

In some embodiments, the at least one polymer is polymer poly-diethyleneglycol bis-allyl carbonate, also known as CR-39. A thermally-polymerizable composition is a composition where polymerization occurs upon exposure to an elevated temperature. A photo-polymerizable composition is a composition where polymerization occurs upon exposure to actinic radiation including, but not limited to, UV, visible, IR, microwave, etc. As used herein "polymerized" refers to a composition comprising a polymer produced by a chemical reaction in which one or more monomers or oligomers bond to each other.

As used herein, a wafer or coating matrix that is "on" a substrate/coating or which has been deposited "onto" a substrate/coating is defined one that (i) is positioned above the substrate/coating, (ii) is not necessarily in contact with the substrate/coating, that is to say one or more intermediate coating(s) may be interleaved between the substrate/coating and the relevant wafer or coating matrix (however, it does preferably contact said substrate/coating), and (iii) does not necessarily completely cover the substrate/coating.

The term "ophthalmic lens" is used to mean a lens adapted to a spectacle frame to protect the eye and/or correct the sight. Said lens can be chosen from afocal, unifocal, bifocal, trifocal, progressive lenses and Fresnel lenses. Although ophthalmic optics is a preferred field of the invention, it will be understood that this invention can be applied to optical elements of other types where filtering blue wavelengths may be beneficial. In some aspects, blue light is defined as light having a wavelength between and including 400 and 460 nm.

A base lens, in the sense of the present invention, should be understood to mean an uncoated substrate, and generally has two main faces. The base lens may in particular be an optically transparent material having the shape of an optical article, for example an ophthalmic lens destined to be mounted in glasses. In this context, the term "base lens" is understood to mean the base constituent material of the optical lens and more particularly of the ophthalmic lens. This material acts as support for the stack of one or more coating matrices or layers.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%. The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one." The term "attenuating" is defined as reducing the amplitude or value of a measurable element, component, or effect. Further, "attenuating transmittance" refers to reducing the transmittance of certain frequencies of light through an object. "Tv %", also referred to as "percent transmission" is the ratio of luminous intensity that is transmitted through a lens or optical article to the luminous intensity that falls on the lens or optical article. Throughout this patent application, the color coordinates are as defined in the CIE L*a*b* color space system for the 10° Standard Observer and Illuminant D65 at an angle of incidence of 15°. In the CIE L*a*b* color system, and in the present disclosure, the term "a*" and "b*" are chromaticity coordinates where +a* is the red direction, −a* is the green direction, +b* is the yellow direction, and −b* is the blue direction. The chromaticity coordinate center, where a* and b* are zero is achromatic. "CIE Standard Illuminant D65", also referred to as "D65", is intended to represent average daylight and has a correlated color temperature of approximately 6500 K. Illuminant D65 is defined in the wavelength range of 330 nm to 700 nm, with extrapolation up to 830 nm.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes the ophthalmic lenses' abilities to provide enhanced color contrast.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

BRIEF DESCRIPTION OF THE FIGURES

FIG. 1A is a diagram depicting a process for producing a master PC pellet batch having a known concentration of one or more transmittance-reducing dyes. FIG. 1B is a diagram depicting a process for producing a qualifier PC pellet batch having a target concentration of one or more transmittance-reducing dyes.

FIG. 4A is a diagram depicting an injection molding process for producing a wafer having one or more transmittance-reducing dyes. FIG. 4B is a diagram depicting a process for making a wafer having one or more transmittance-reducing dyes. The process includes a cast film extrusion step, a film-cutting step, and a wafer thermoforming step. FIG. 4C is a diagram depicting an injection overmolding process for making a lens fuse-bonded to a wafer having one or more transmittance-reducing dyes.

DETAILED DESCRIPTION

Figure 1A:
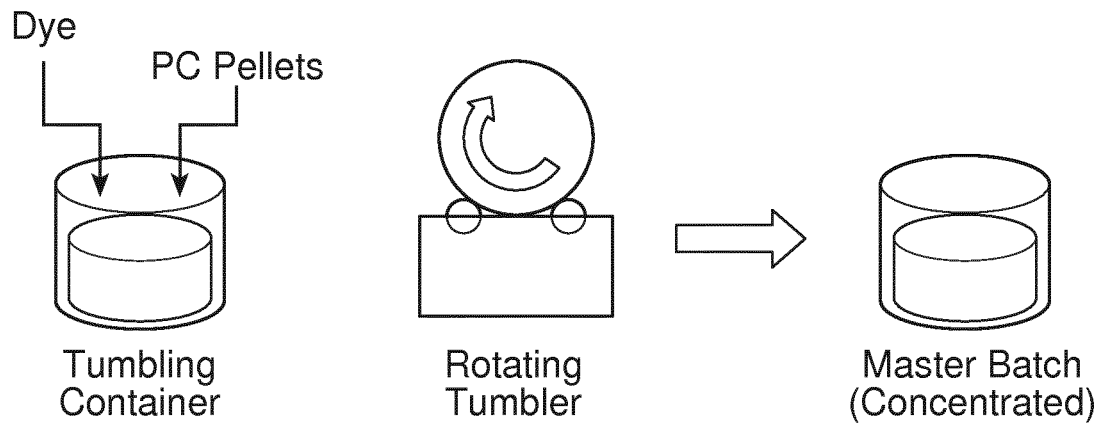
FIGS. 1A-1B.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In the present disclosure, unless otherwise specified, transmittance is measured at the center of the ophthalmic lens for a thickness ranging from 0.7 to 2 mm, preferably from 0.8 to 1.5 mm, at an angle of incidence ranging from 0° to 15°, preferably 0°. As used herein, the light transmitted refers to light arriving on the front main face of the ophthalmic lens and that went through the lens. The a* and b* values may be assessed using the illuminant D65 as defined by CIE.

The chemical nature of the transmittance-reducing dyes that may act as a means for at least partially inhibiting light within the visible spectrum is not particularly limited, provided that it has an absorption peak, ideally a maximum absorption peak, within the 390-700 nm range. In some aspects, the transmittance-reducing dyes include one or more dyes from the group consisting of: auramine O; coumarin 343; coumarin 314; nitrobenzoxadiazole; lucifer yellow CH; 9,10-bis(phenylethynyl)anthracene; proflavin; 4-(dicyanomethylene)-2-methyl-6-(4-dimethylaminostyryl)-4H-pyran; 2-[4-(dimethylamino)styryl]-1-methypyridinium iodide, lutein and zeaxanthin. In embodiments, the transmittance-reducing dyes comprise one or more porphyrins, porphyrin complexes, other heterocycles related to porphyrins, including corrins, chlorins and corphins, derivatives thereof, or the perylene, coumarin, acridine, indolenin (also known as 3H-indole) and indol-2-ylidene families. "Derivative," in relation to a parent compound, refers to a chemically modified parent compound or an analog thereof, wherein at least one substituent is different from the corresponding substituent in the parent compound or analog thereof. One such non-limiting example is a parent compound which has been covalently modified.

Porphyrins are well-known macrocycle compounds composed of four modified pyrrole subunits interconnected at their carbon atoms via methine bridges. The parent porphyrin is porphine and substituted porphines are called porphyrins. Porphyrins are the conjugate acids of ligands that bind metals to form (coordination) complexes. Certain porphyrins or porphyrin complexes or derivatives provide selective absorption filters having a bandwidth in some cases of for example 20 nm in the selected range of wavelengths. The selectivity property is in part provided by the symmetry of the molecules.

For example, the one or more porphyrins or porphyrin complexes or derivatives are selected from the group consisting of Chlorophyll a; Chlorophyll b; 5,10,15,20-tetrakis (4-sulfonatophenyl) porphyrin sodium salt complex; 5,10,15,20-tetrakis(N-alkyl-4-pyridyl) porphyrin complex; 5,10,15,20-tetrakis(N-alkyl-3-pyridyl) porphyrin complex, and 5,10,15,20-tetrakis(N-alkyl-2-pyridyl) porphyrin complex, the alkyl being preferably an alkyl chain, linear or branched, comprising 1 to 4 carbon atoms per chain. For example the alkyl may be selected from the group consisting of methyl, ethyl, butyl and propyl.

The complex usually is a metal complex, the metal being selected from the group consisting of Cr(III), Ag(II), In(III), Mn(III), Sn(IV), Fe (III), Co (II), Mg(II) and Zn(II). Cr(III), Ag(II), In(III), Mn(III), Sn(IV), Fe (III), Co (II) and Zn(II) demonstrate absorption in water in the range of 425 nm to 448 nm with sharp absorption peaks. Moreover, the complexes they provide are stable and not acid sensitive. Cr(III), Ag(II), In(III), Sn(IV), Fe (III), in particular, do not exhibit fluorescence at room temperature which is a useful property in optical lenses such as ophthalmic lenses.

In some embodiments, the one or more porphyrins or porphyrin complexes or derivatives are selected from the group consisting of magnesium meso-tetra(4-sulfonatophenyl) porphine tetrasodium salt, magnesium octaethylporphyrin, magnesium tetramesitylporphyrin, octaethylporphyrin, tetrakis (2,6-dichlorophenyl) porphyrin, tetrakis (o-aminophenyl) porphyrin, tetramesitylporphyrin, tetraphenylporphyrin, zinc octaethylporphyrin, zinc tetramesitylporphyrin, zinc tetraphenylporphyrin, and diprotonated-tetraphenylporphyrin.

An objective of the present disclosure is to provide ophthalmic articles with two or more transmittance-reducing dyes incorporated therein in which the color is tuned to provide an a* less than 12 and a b* less than 4, preferably less than 1. As described in the examples and experiments below, the dyes can be incorporated into the base lens, or other lens component, and retain their transmittance-reduction capacities. The dyes were selected to provide transmission minima centered around: 495 nm (peak 1); 585 nm (peak 2); and 700 nm (peak 3) for color balancing.

A polycarbonate (PC) thermoset polymer is used to produce the lenses and lens wafers described in the examples below, however, a different thermoset polymer or a combination of thermoset polymers may be used. The term "dye" as used below encompasses any functional additive, including but not limited to dyes, tints, or other additives desired for incorporation into a film or laminate.

EXAMPLES

Example 1

Incorporation of Dyes into Pre-Blended PC Resin

Figure 1B:
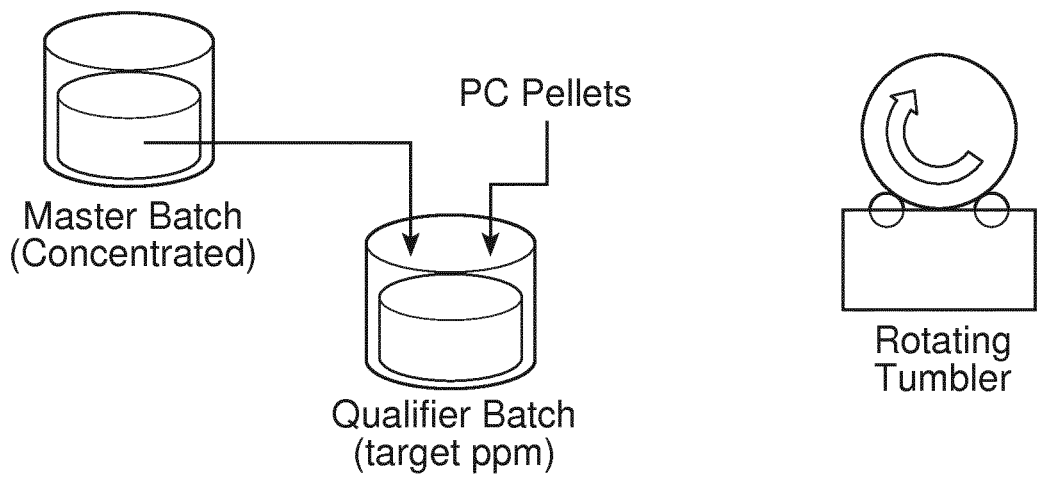

The transmittance-reducing dyes may be combined with PC resin pellets to provide a pre-blended PC resin having the dyes incorporated therein. As illustrated in the embodiment depicted in FIG. 1A, PC pellets and one or more transimtance-reducing dyes may be combined, for example, in a tumbling container and tumbled to provide a dye-inclusive PC master batch concentrate. The concentration (ppm) of each dye in the dye-inclusive PC concentrate is known, and this dye-inclusive PC master batch concentrate may be combined with PC pellets having no dyes (or having different dyes) to provide a PC resin qualifier batch blend having a target dye concentration (FIG. 1B). The PC target concentration batch may then be used in the production of dye-inclusive lenses or dye-inclusive wafers.

Example 2

Dye-Inclusive PC Pellets Molded into Lens

Figure 2:
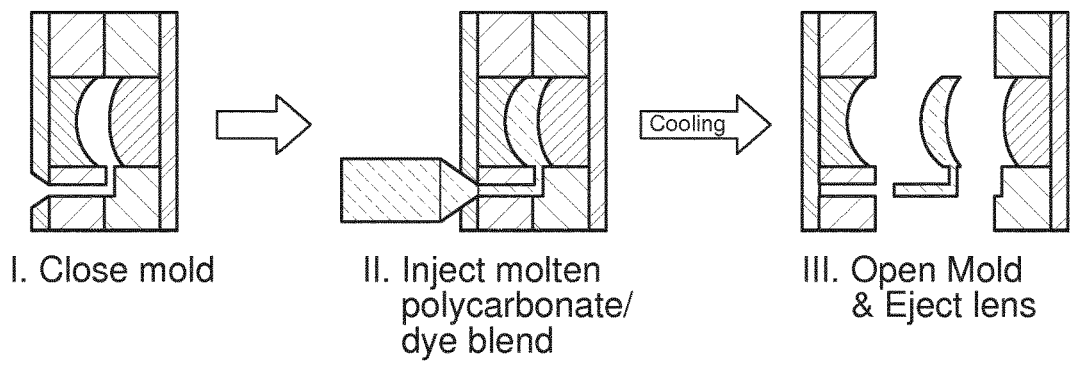
FIG. 2 is a diagram depicting an injection molding process for producing an ophthalmic lens having one or more transmittance-reducing dyes.

The PC pellets having a target dye concentration produced in Example 1, i.e., the qualifier batch, may be used to produce a lens having the transmittance-reducing dyes incorporated therein. As depicted in FIG. 2, a molten, dye-inclusive polycarbonate/dye blend may be injected into a closed mold. After cooling, the mold is opened and the lens is ejected. The lens includes the transmittance-reducing dyes incorporated homogeneously.

Figure 3:
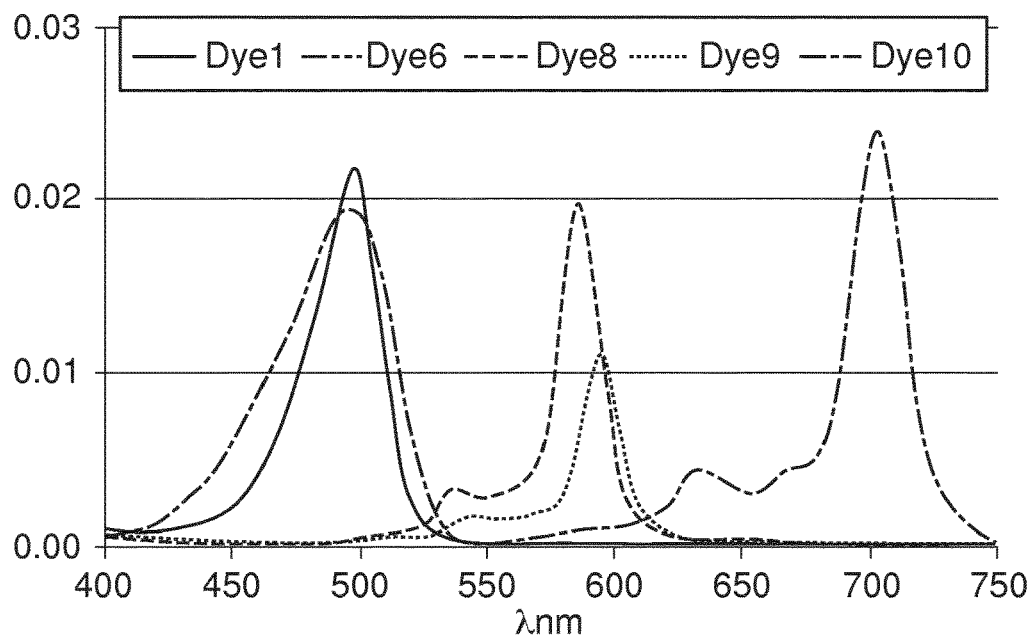
FIG. 3 is a graph depicting molar absorbtivity values (c) versus wavelength for various dyes in polycarbonate lenses.

The graph in FIG. 3 depicts molar absorbtivity values (c) versus wavelength for various dyes in polycarbonate lenses. Dye 9 exhibits little to no absorption, and is therefore not compatible with the PC lens production process. Dyes 1, 6, 8, and 10 exhibit improved absorption spectra and are compatible with the PC lens production process.

TABLE 1

| Dye-inclusive PC Pellets Molded Into Lens (Lens thickness = 2.0 mm) | | | |
|---|---|---|---|
| | | A | B |
| Dye Concentration (Nominal ppm) | Dye 2 | 7.9 | 7.8 |
| | Dye 8 | 8.2 | 8.0 |
| | Dye 10 | 5.5 | 11.9 |
| Color (after hard coat) | $Tv_{D65}$ | 69% | 69% |
| | a* | 7 | 5 |
| | b* | −2 | −1 |
| | Peak 2 (~585 nm) | 13.9 | 13.4 |
| | Peak 3 (~702 nm) | 8.7 | 18.9 |

Example 3

Dye-Inclusive PC Pellets Molded into Wafer (for Subsequent Over-Molding and Lamination)

Figure 4A:
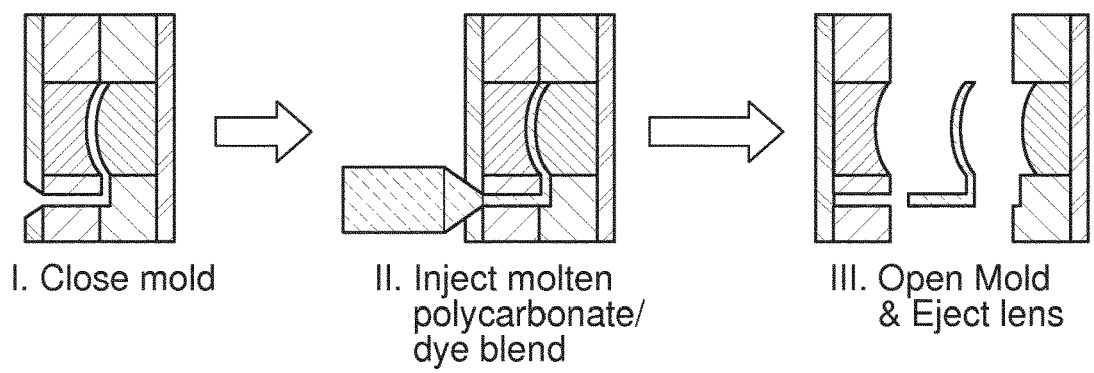
FIGS. 4A-4C.

The PC pellets having a target dye concentration produced in Example 1 may be used to produce a thin wafer through an injection molding process. Referring to the embodiment depicted in FIG. 4A, molten, dye-inclusive polycarbonate/dye blend is injected into a mold. After cooling, the mold is opened and the thin wafer is ejected. The thin wafer includes the transmittance-reducing dyes incorporated homogeneously.

TABLE 2

Dye-inclusive PC pellets molded into wafer
(Wafer thickness = 1.2 mm/Lens thickness = 1.8 mm)

|  |  | C | D |
|---|---|---|---|
| Dye Concentration | Dye 2 | 13.4 | 13.5 |
| (Nominal ppm) | Dye 8 | 13.9 | 13.4 |
|  | Dye 10 | 8.7 | 18.9 |
| Color | Tv$_{D65}$ | 72% | 72% |
| (after antireflective coating) | a* | 7 | 5 |
|  | b* | 1 | 1 |

Example 4

Dye-Inclusive PC Pellets Cast Extruded into Film (for Subsequent Over-Molding and Lamination)

Figure 4B:
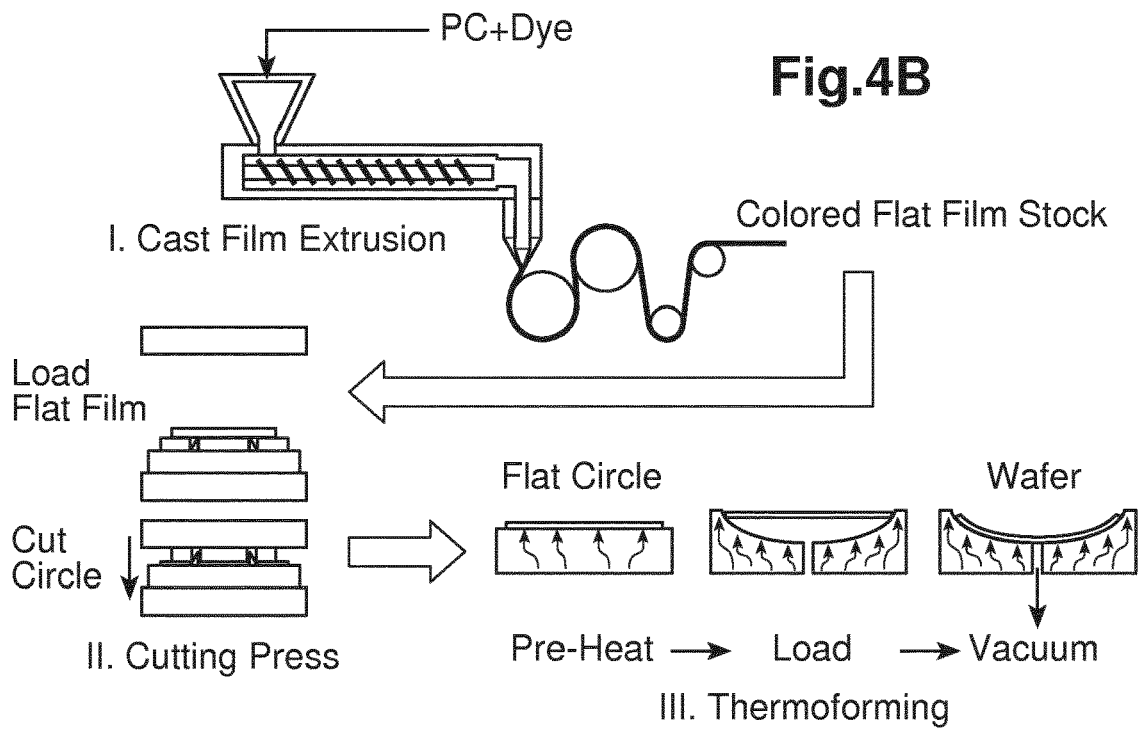
Figure 4C:
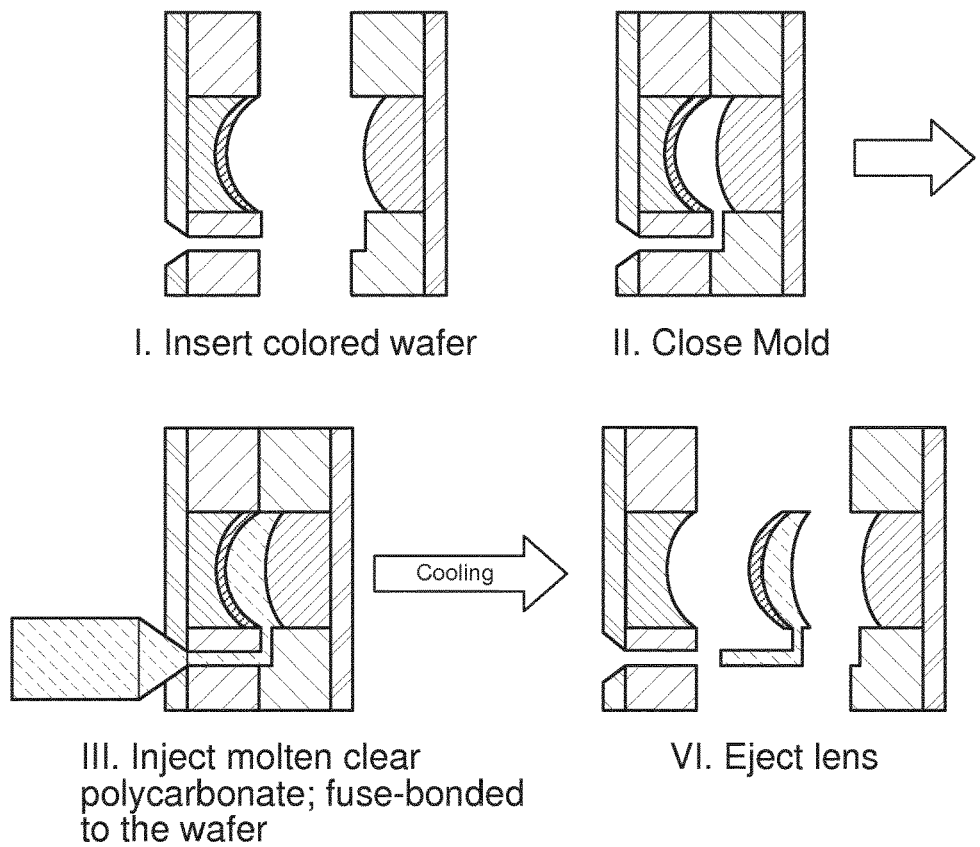

The PC pellets having a target dye concentration produced in Example 1 may be used to produce a thin wafer through a cast extrusion process. As depicted in FIG. 4B, a dye-inclusive polycarbonate blend is introduced into an extruder. Upon exiting the extruder die, the emerging film is flattened and/or stretched over a series of rolls. A portion of the dye-incorporated film is cut into an appropriate shape, e.g., a circle, on a cutting press. The circular film may then be combined with one or more additional films and thermoformed into a thin wafer.

Example 5

Integration of Dyes in a Coating Matrix

Figure 5:
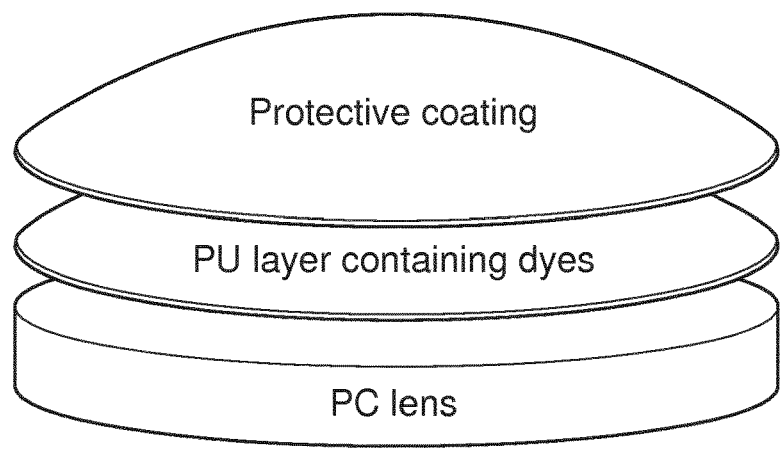
FIG. 5 is a diagram depicting a polyurethane coating matrix having one or more transmittance-reducing dyes incorporated therein.
Figure 6:
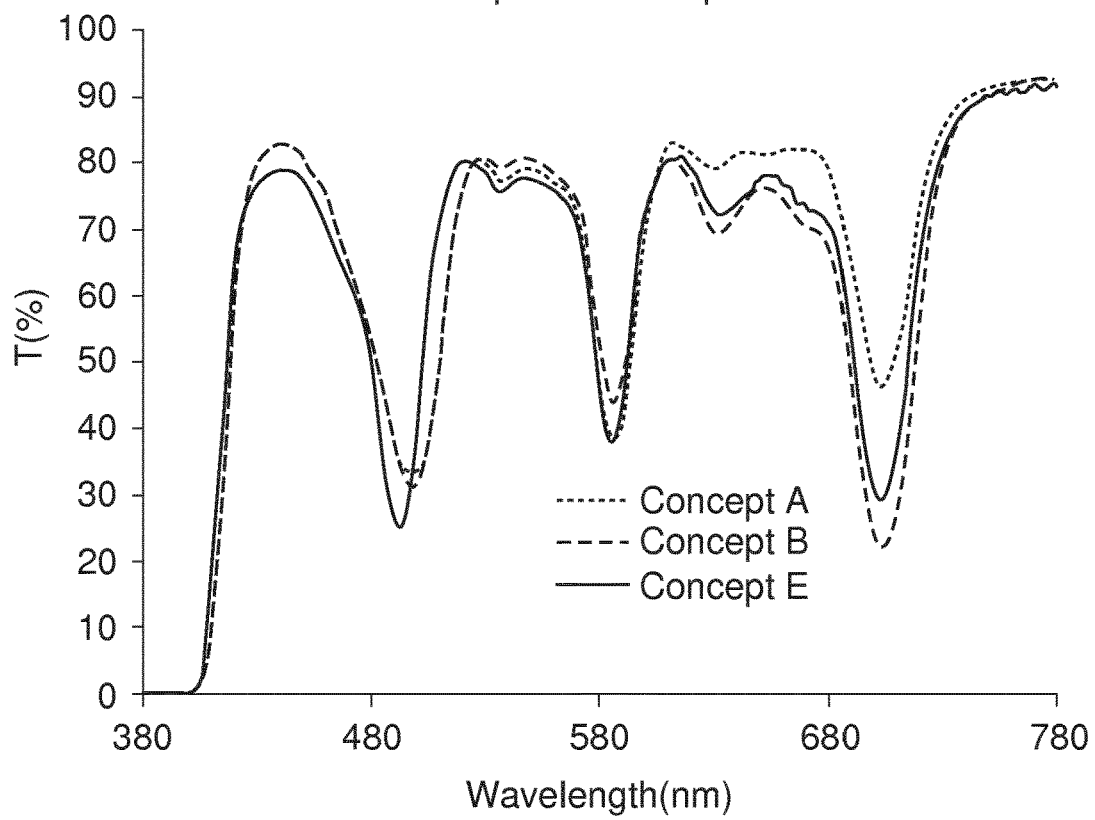
FIG. 6 is a graph depicting transmission spectra for concepts A and B of Example 2 (dyes integrated within a polycarbonate lens) and concept E of Example 5 (dyes within a polyurethane coating matrix).

One or more transmittance-attenuating dyes may be incorporated into a coating matrix. In some aspects, one or more dyes may be mixed by agitation into a total liquid coating or pre-mixed into one of the coating's components. The coating matrix depicted in FIG. 5 is a polyurethane matrix having one or more transmittance-attenuating dyes incorporated therein. Lens concept E was simulated using dyes integrated within a polyurethane coating matrix. The lens has an a* of 2 and b* of 1. The graph in FIG. 6 depicts transmission spectra for concepts A and B of Example 2 (dyes integrated within a polycarbonate lens) and concept E of Example 5 (dyes integrated within a polyurethane coating matrix).

TABLE 3

Dyes in Polyurethane Coating Matrix
(simulation on 2 mm polycarbonate lens)

|  |  | E |
|---|---|---|
| Dye Concentration in PU layer | Dye 1 | 0.096% |
| (Nominal weight percent) | Dye 7 | 0.086% |
|  | Dye 10 | 0.110% |
| Color | Tv$_{D65}$ | 69% |
| (after PU coating) | a* | 2 |
|  | b* | 1 |

Example 6

Dye and Matrix Compatibility

The table below depicts compatibility of dyes with different matrices. "C" signifies compatibility between dye and matrix. "X" signifies that the dye and matrix are incompatible.

TABLE 4

Dye and Matrix Compatibility

| | Dyes organized by frequency range of attenuation | | | | | | | | | |
|---|---|---|---|---|---|---|---|---|---|---|
| | 460-510 nm | | | | | | 570-600 nm | | | 670-715 nm |
| Matrix | Dye 1 | Dye 2 | Dye 3 | Dye 4 | Dye 5 | Dye 6 | Dye 7 | Dye 8 | Dye 9 | Dye 10 |
| PC (2 mm) | X | C | X | X | C | C | C | C | C | C |
| PU (~20 µm) | C | X | X | C | C | C | C | C | C | |
| MR8 (2 mm) | X | X | X | C | — | — | X | C | C | |
| Epoxy (3 µm) | C | X | X | X | — | — | C | C | C | |

MR = Mitsui resin

In summary, the disclosure provides various methods for incorporating one or more transmittance-attenuating dyes into an ophthalmic article. Different dyes from different manufacturers can be combined and their relative amounts adjusted to tailor the transmittance at different wavelengths. Tailoring the transmittance at different wavelengths allows the lens producer to custom-tune the color balance perceived by the wearer.

The claims are not to be interpreted as including means-plus- or step-plus-function limitations, unless such a limitation is explicitly recited in a given claim using the phrase(s) "means for" or "step for," respectively.

The invention claimed is:

1. An optical article comprising:
   a polymerized lens comprising at least one polymer; and
   a lens component configured to impart reduced light transmittance over a plurality of wavelength regions, comprising:
      a first light transmittance-reducing dye configured to impart a first region of reduced light transmittance located between about 460 nanometers and 510 nanometers;
      a second light transmittance-reducing dye configured to impart a second region of reduced light transmittance located between about 570 nanometers and 600 nanometers; and
      a third light transmittance-reducing dye configured to impart a third region of reduced light transmittance located between about 670 nanometers and 715 nanometers;
   wherein
   a resulting average transmission from 460 nanometers to 510 nanometers less than 60%;
   a resulting average transmission from 570 nanometers to 600 nanometers less than 75%;
   a resulting average transmission from 670 nanometers to 715 nanometers less than 80%; and
   wherein a resulting total transmission TvD65 is greater than 68%.

2. The optical article of claim 1, wherein the lens component configured to impart reduced light transmittance to the polymerized lens, wherein the polymerized lens comprises a blend of the at least one polymer and the light transmittance-reducing dyes.

3. A method of making the optical article of claim 2, the method comprising producing a master-batch concentrate comprising the step of blending the light transmittance-reducing dyes and a first set of polymer pellets.

4. The method of claim 3, the method comprising producing a qualifier batch blend of polymer pellets having a targeted concentration of the light transmittance-reducing dyes, the method comprising the step of adding the master-batch concentrate to a second set of polymer pellets to achieve the targeted concentration of the light transmittance-reducing dyes in the second set of polymer pellets.

5. The optical article of claim 1, wherein the lens component configured to impart reduced light transmittance is a colored wafer.

6. A method of making the colored wafer of claim 5, the method comprising producing a master-batch concentrate comprising the step of blending the light transmittance-reducing dyes and a first set of polymer pellets.

7. The method of claim 6, the method comprising producing a qualifier batch blend of polymer pellets having a targeted concentration of the light transmittance-reducing dyes, the method comprising the step of adding the master-batch concentrate to a second set of polymer pellets to achieve the targeted concentration of the light transmittance-reducing dyes in the second set of polymer pellets.

8. The optical article of claim 5, wherein the colored wafer is an extruded and thermoformed film.

9. The optical article of claim 5, wherein the colored wafer is an injection molded film.

10. The optical article of claim 1, wherein the lens comprises at least one additional light transmittance-reducing component.

11. The optical article of claim 10, wherein the at least one additional light transmittance-reducing component that reduces light transmittance is an interferential filter.

12. The optical article of claim 10, wherein the at least one additional light transmittance-reducing component is a tinted film.

13. The optical article of claim 1, wherein the lens component configured to impart reduced light transmittance is a coating matrix.

14. The optical article of claim 13, wherein the coating matrix is comprises a polyurethane coating matrix layer.

* * * * *